United States Patent [19]

Levison

[11] Patent Number: 5,295,610
[45] Date of Patent: Mar. 22, 1994

[54] MIXING CAN HAVING A HINGED CAP WITH AN INTEGRAL MEASURING CUP

[76] Inventor: Philip W. Levison, 1343 Park Ave. West, Mansfield, Ohio 44906

[21] Appl. No.: 795,759

[22] Filed: Nov. 21, 1991

[51] Int. Cl.⁵ .............................................. B67D 5/06
[52] U.S. Cl. ......................................... 222/26; 222/29; 222/157; 222/468; 222/482; 73/427
[58] Field of Search ............... 222/25, 26, 29, 157, 222/158, 468, 482, 489, 566, 572; 141/98, 322, 321, 320; 73/426, 427, 428

[56] References Cited

U.S. PATENT DOCUMENTS

| | | | |
|---|---|---|---|
| 2,326,881 | 8/1943 | Packer | 222/566 X |
| 3,159,320 | 12/1964 | Scholtz | 222/468 |
| 3,729,122 | 4/1973 | Flider | 222/482 X |
| 3,948,105 | 4/1976 | Johnson | 222/427 |
| 4,135,404 | 1/1979 | Butler | 222/158 X |
| 4,135,650 | 1/1979 | Schiemann | 222/572 |
| 4,292,846 | 10/1981 | Barnett | 73/427 |
| 4,294,372 | 10/1981 | Onishi | 220/20 |
| 4,480,470 | 11/1984 | Tussing | 73/427 |
| 4,509,567 | 4/1985 | Harrison et al. | 141/98 X |
| 4,767,027 | 8/1988 | Lewinter et al. | 222/158 |
| 4,819,833 | 4/1989 | Huddleston | 222/155 |
| 5,108,016 | 4/1992 | Waring | 222/468 |

Primary Examiner—Andres Kashnikow
Assistant Examiner—Kenneth Bomberg

[57] ABSTRACT

A plastic gas can for the main purpose of blending 2 cycle fuel mixture and de-markation of ratio mixed by using an attached hinged cap (30) with an integrated measuring cup (10A) and exposed thumb-tabbed pointer (15) positioned to one of the engraved ratios (17) on hinged cap's (30) surface. ½ gallon graduations (26) molded on can's (28) side along with gas and oil ratio reference chart (25) and measuring cup's (10A) ounces, milliliters, and ratio graduations (10B) are for accurate proportioning of gas and oil.

8 Claims, 5 Drawing Sheets

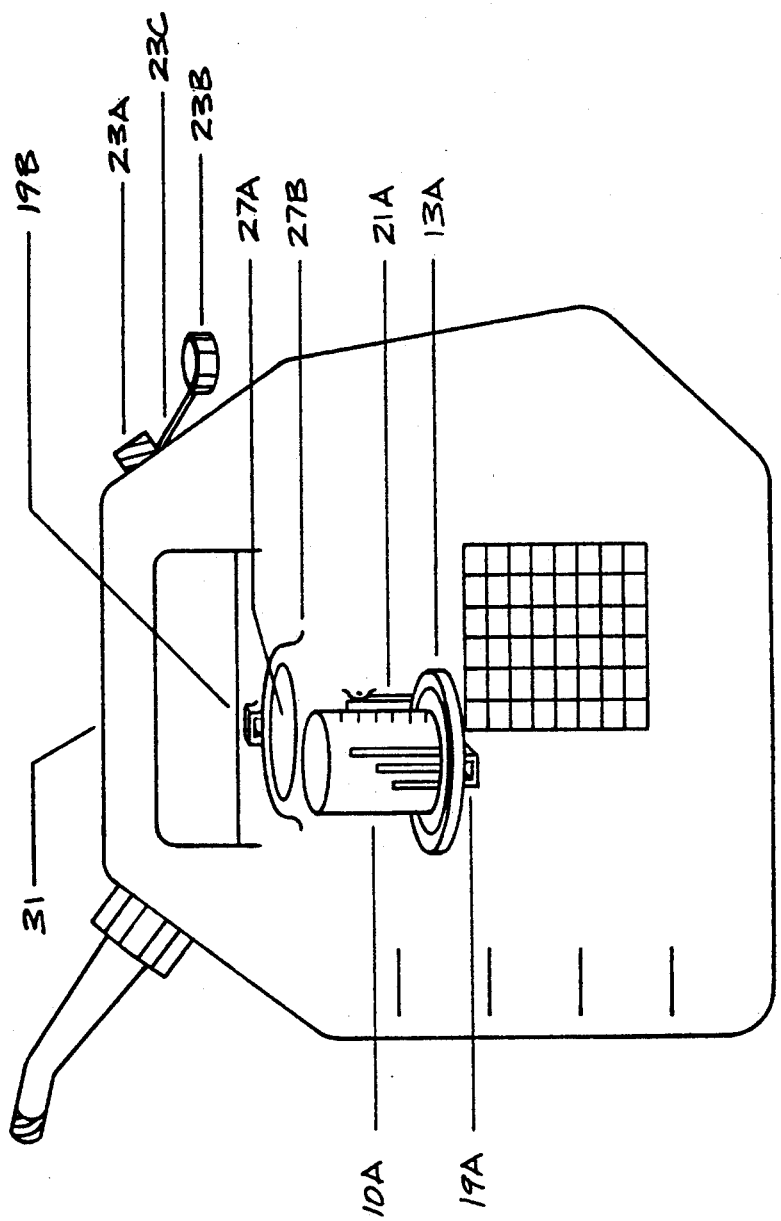

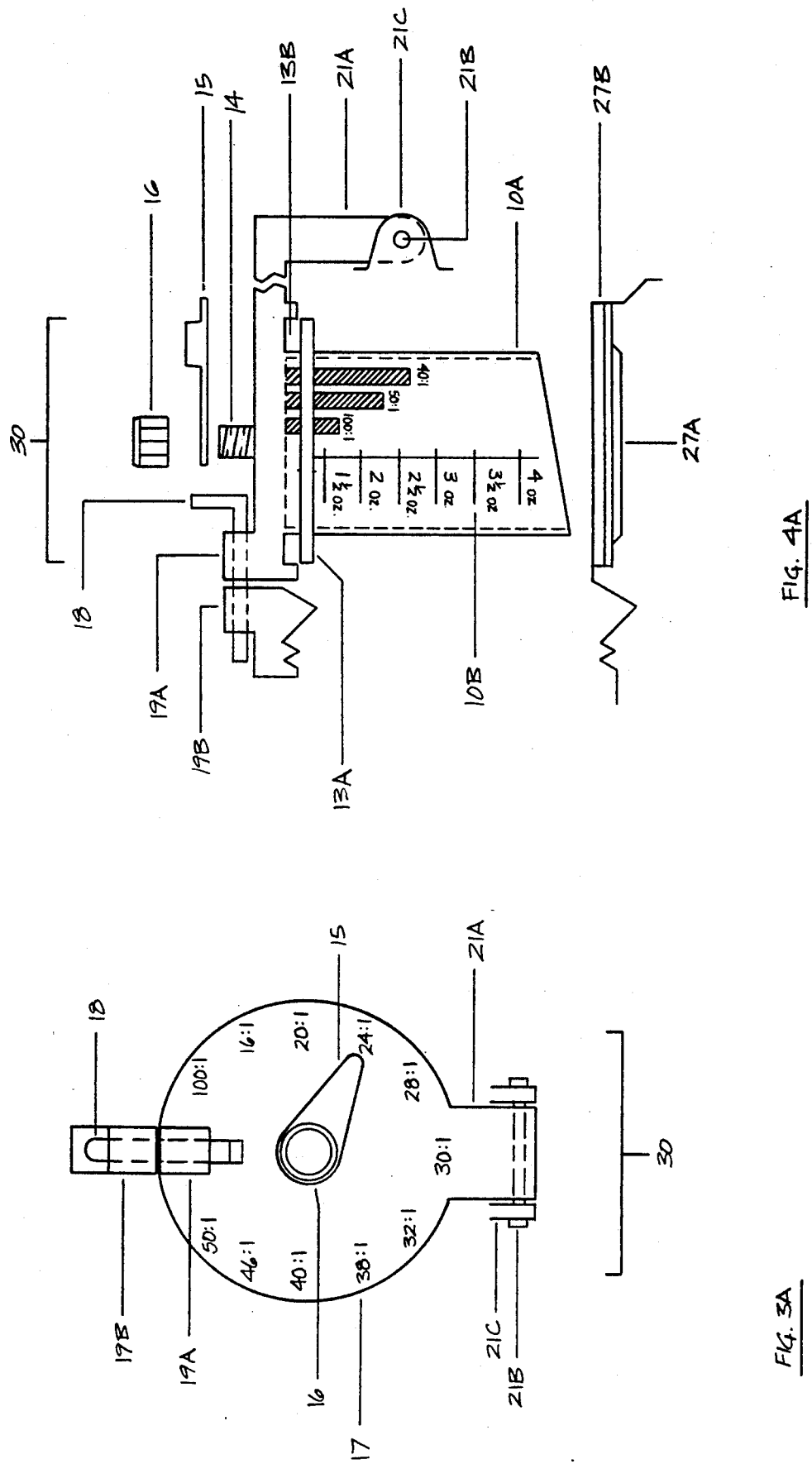

| GALS | RATIOS | | | | | | OUNCES OF OIL | | | | | | |
|---|---|---|---|---|---|---|---|---|---|---|---|---|---|
| | 16:1 | 24:1 | 32:1 | 40:1 | 50:1 | | | | | | | | |
| ½ GAL | 4 OZ. | 2½ OZ. | 2 OZ. | 1½ OZ. | 1½ OZ. | | | | | | | | |
| 1 GAL | 8 OZ. | 5 OZ. | 4 OZ. | 3 OZ. | 3 OZ. | | | | | | | | |
| 1½ GAL | 12 OZ. | 7½ OZ. | 6 OZ. | 4½ OZ. | 4½ OZ. | | | | | | | | |
| 2 GAL | 16 OZ. | 10 OZ. | 8 OZ. | 6 OZ. | 6 OZ. | | | | | | | | |
| 2½ GAL | 20 OZ. | 12½ OZ. | 10 OZ. | 7½ OZ. | 7½ OZ. | | | | | | | | |
| 3 GAL | 24 OZ. | 15 OZ. | 12 OZ. | 9 OZ. | 9 OZ. | | | | | | | | |

FIG 6A

MIXING CAN HAVING A HINGED CAP WITH AN INTEGRAL MEASURING CUP

BACKGROUND FIELD OF INVENTION

This invention relates to the mixing of 2 cycle oil with gas for 2 stroke engines in the form of plastic gas can with a non-removable, self-contained graduated measuring cup, gas and oil ratio reference chart, and ratio indicator or pointer.

BACKGROUND DESCRIPTION OF PRIOR ART

Heretofore gas and oil mechanisms are commonly mixed using a separate measuring device. A separate instrument would be subject to breakage, contamination, or mis-placment. The results could be an inaccurate calculation of oil and gas or foreign materials eventually finding their way to engine fuel tank or carburator.

It is also common to own more than one 2 stroke engine requiring different amounts of gas and oil ratios. This necessitates proper labeling of content's ratio on gas cans to avoid mix ups or confusion. Labeling may be ineffective since gasoline can be a solvent to certain label adhesives or ink markers.

Another common problem with gas cans are leaks developing around the nozzle where repeated twisting clockwise and counterclockwise to fill and seal gas can may rupture nozzle gasket. There is also a chance of threads becoming stripped resulting in loss of accurate pouring of gas contents.

Inventors have created several solutions for gas cans or gas caps for specific use for mixing gas and oil for 2 stroke engines. U.S. Pat. No. 4,480,470 Tussing Nov. 84' is a "Gas Cap" with measuring tube attached to the bottom and a gas mixed with oil indicator along with a vent screw on the top. The disadvantages to this invention are 1) the said cap requires removal from its container. Its separation may result in a) mis-placment, b) breakage, and c) contamination. 2.) The vent screw position on top of said gas cap prohibits the said cap to be free-standing while filling said measuring tube. 3.) Because the said cap has to be inserted and twisted to close its container the a.) said measuring tube is subject to breakage possibly striking tank or can opening and sides. b.) Said caps metal tabs bending, losing seal on can or tank c.) Because said tube and said cap are two components ajoined together detachment is possible from engine vibration when applied to engine fuel tank closure. 4.) Because said cap, said indicator and said vent screw are metal on said cap's top surface they are subject to rust and corrosion when exposed to adverse climate, or water elements. 5.) The said gas mix oil indicator is non-specific concerning gas and oil mixture ratio in said tank or can. 6.) Gas oil inscription on said cap's side is difficult to read when said cap is in closed position on said can or tank. 7.) Said cap also requires a gasket to seal closure which is subject to rupture due to repeated twisting to open and close said can or tank.

Some inventions are more self contained such as U.S. Pat. No. 4,819,833 Huddleston April 89'. This 'Measuring Metering & Mixing Can' has several disadvantages. 1.) The container and compartments are of complex design resulting in a.) considerable manufacturing expense b.) moving parts in said compartments subject to dis-repair, and c.) difficult for novice to figure out operation of said can 2.) Said can does not provide ratio mixing information or denotation. 3.) Said can fabricated of metal is also subject to rust and corrosion when exposed to adverse climate and water elements.

Invention U.S. Pat. No. 4,294,372 Onishi Oct. 81' the 'Small-Sized Container Capable of Mixing More Than Two Components at Predetermined Mixing Ratio' also presents the following disadvantages 1.) There is no information on said can for gas and oil mixing ratios or ratio denotation. 2.) Said cans two compartments molded inside said can result in difficult inspection of contents. 3.) Said can's baffled compartments require vigorous agitation for combining oil and gas resulting in a.) excessive air pressure making said can dangerous to purge b.) possible leaks at closure seals, and c.) back-siphoning of gas in compartments, thereby making next measurement of oil inaccurate. 4.) Said can's three compartments may confuse novice resulting in error in mixing ingredients.

OBJECTS & ADVANTAGES

Accordingly, besides the objects and advantages of previous gas cans and or gas cap patents my invention's objects and advantages are.

a.) to provide gas and oil mixing can using in-expensive to manufacture plastic;

b.) to provide a gas and oil mixing can that is shockproof and corrosion resistant;

c.) to provide a gas and oil mixing can with a self-attached measuring cup avoiding breakage, mis-placment, and contamination;

d.) to provide a gas and oil mixing can that features $\frac{1}{2}$ gallon graduations on side of said can for accurate metering of gas;

e.) to provide a gas and oil mixing can with easy access to components and said can's reservoir without removal of nozzle;

f.) to provide a gas and oil mixing can that allows for easy inspection of contents via said can's hole;

g.) to provide a gas and oil mixing can that features gas and oil ratio reference chart molded on side of said can;

h.) to provide gas and oil mixing can with a movable pointer on said can's cap for ratio denotation engraved therein;

i.) to provide a gas and oil mixing can with a non-twisting hinged cap sealing said can's hole with 90° traversal to expose and fill said can's measuring cup;

j.) to provide a gas and oil mixing can that features milliliters, ounces; and ratio graduations engraved on said measuring cup;

k.) to provide a gas and oil mixing can that contains few components;

l.) to provide a gas and oil mixing can that could be used for dilution and mixing of other materials in gasoline;

m.) to provide a gas and oil mixing can that could be used for dilution and mixing of fertilizers and chemicals in water for agricultural and horticultural applications n.) to provide a gas and oil mixing can that could be used for dilution and mixing of acids or chemical treatments of flat masonry surfaces or wood decks; and o.) to provide a gas and oil mixing can with a threaded tipped nozzle for adapting sprinkler heads. Further objects and advantages are to provide a gas and oil mixing can that is convenient requiring less time to locate necessary parts and information to accurately mix gas and oil for a 2 stroke or 2 cycle engine. The pointer on the gas cap of the 2 cycle gas can provides immediate information of gas and oil ratio presently inside can, reducing confusion when having more than two mixes for two different engines. The 2 cycle gas can's oil mixing chart and measuring cup provide a teaching tool with basic information for the novice. Another advantage to the plastic 2 Cycle Gas Can is its portablilty due to self containment resulting in convenience for stowing in small areas or taking to remote areas. Still further objects and advantages will become apparent with ensuing description and drawings.

DRAWING FIGURES

Figures are related by having the same alphabetic suffix with different single digit numbers.

FIG. 2A is an isometric embodiment of can 28 and cap 30 in the open position.

FIG. 3A is a top view of cap 30.

FIG. 4A is a side exploded view of cap 30 and portions of the can 28.

FIG. 6A is an enlarged view of the gas and oil ratio reference chart 25.

REFERENCE NUMERALS

Figure 1A:
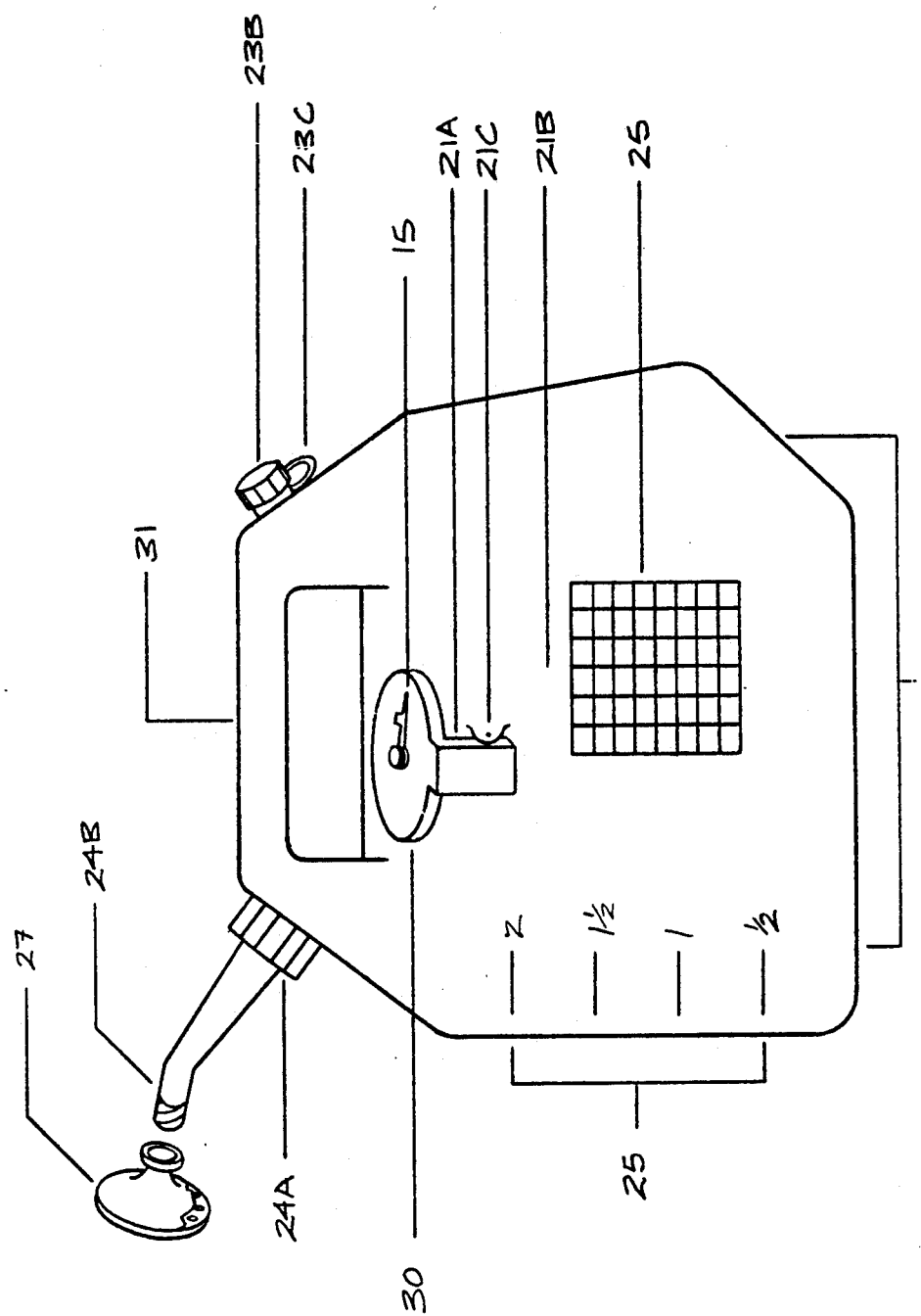
FIG. 1A is an isometric embodiment of can 28 with cap 30 in the closed position

Reference numerals that relate to each other have alphabetical suffixes:

10A - measuring cup
10B - measuring cup milliliters, ounces and ratio graduations
13A - cap gasket
13B - cap groove
14 - cap stud
15 - thumb-tabbed pointer
16 - plastic cap nut
17 - engraved ratios
18 - latch bolt
19A - cap latch saddle
19B - can latch saddle
21A - cap hinge
21B - cap hinge pin
21C - can hinge saddle
23A - air-release port
23B - plastic cap
23C - plastic cap strap
24A - nozzle
24B - threaded tip
25 - gas and oil ratio reference chart
26 - ¼ gallon graduations
27A - can hole
27B - can lip
29 - sprinkler head
30 - hinged cap
31 - handle

DESCRIPTION ON FIGS 1A-6A

A typical embodiment of the present invention is illustrated in FIG. 1A and 2A that reveal a plastic gas can 28 with ½ gallon graduations 26 molded on left side and gas/oil ratio reference chart 25 molded on right side detailed in FIG. 6A. FIG. 1A and 2A also denote plastic nozzle 24A with threaded tip 24B, to possibly mate with a sprinkler head 29 for dispensing water mixed solutions. FIG. 1A and 2A show handle 31 for dispensing or carrying said can 28. FIG. 2A also show air-release port 23A with attached plastic cap 23B adjoined to threaded neck of said air-release port 23A by means of plastic strap 23C, located rear of said handle 31. FIG. 1A shows the hinged cap 30 attached at the side of said can 28 via cap/hinge 21A and cap hinge pin 21B cradled with cap hinge saddle 21C seen in FIG. 3A top view and FIG. 4A side views. Said hinged cap 30 is latched on top surface of said can 28 FIG. 3A, with cap latch saddle 19A and can latch saddle 19B adjoined via latch bolt 18 seen also from side view in FIG. 4A. The cap hole 27A is on said can's 28 flat surface in FIG. 2A & 4A with a molded raised lip 27B to accept cap gasket 13A seated in cap groove 13B in said hinged cap 30.

Figure 5A:
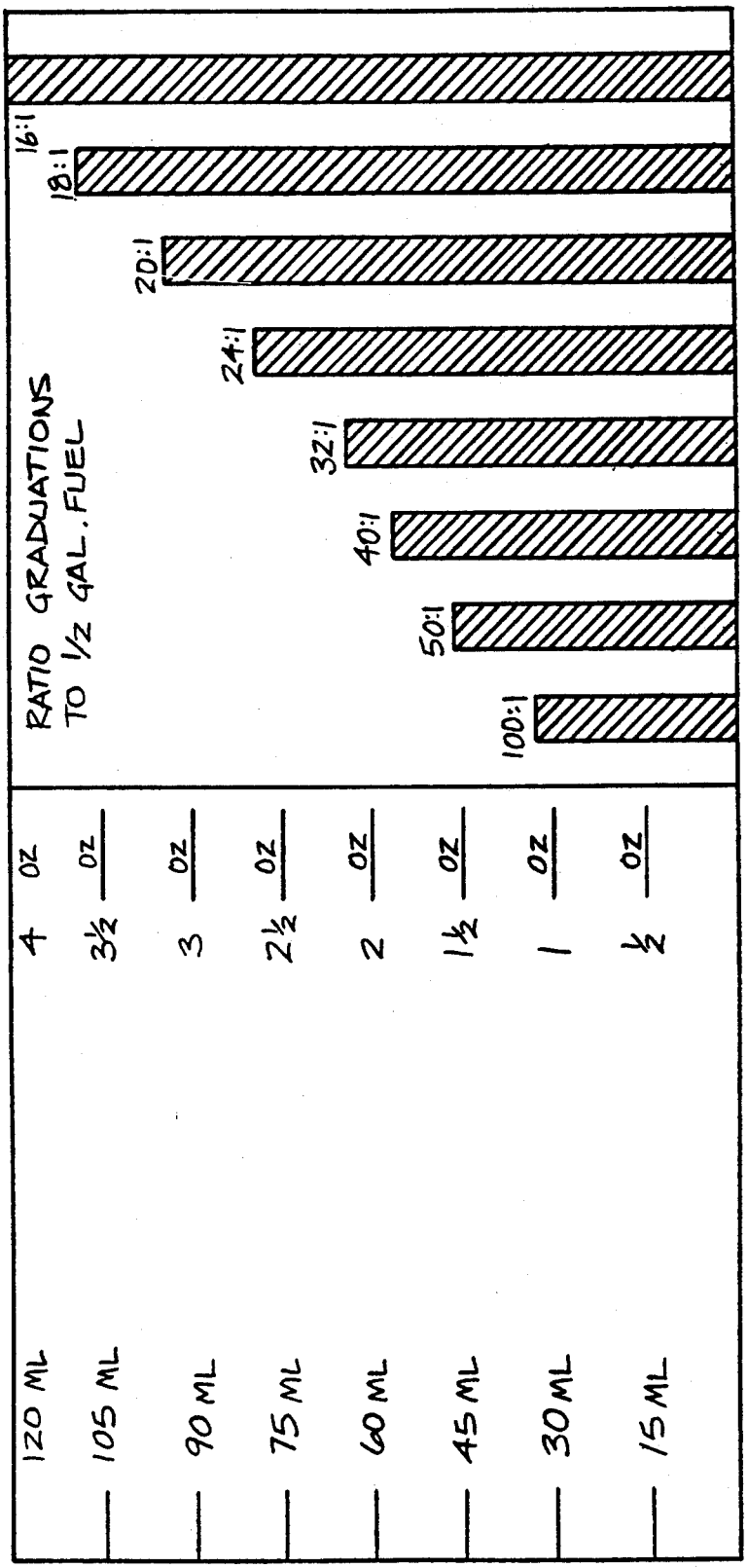
FIG. 5A is flat plane embodiment of the measuring cup 10A.

FIG. 3A shows said hinged cap's 30 top surface with engraved ratios 17 indicated by a moveable thumb-tabbed pointer 15, secured by plastic cap nut 16 over cap stud 14 molded to said hinged cap 30 side view shown in FIG. 4A. FIG. 2A and 4A give embodiments of measuring cup 10A molded to said hinged cap 30 and detailed flat plane perspective in FIG. 5A of measuring cup mililiters, ounces, and ratio graduations 10B engraved in said measuring cup 10A. FIG. 4A and 2A show consecutively top view and isometric side view of can hole 27A and can lip 27B as it relates to said hinged cap 30 in communication with cap gasket 13A mated with cap groove 3B as illustrated in FIG. 4A. From the description above a number of advantages of my invention become apparent.

1.) the 2 cycle gas can is made of few parts moving in simple fashion as they relate to each other;
2.) the plastic parts are easier to a) consolidate, b) affordable, c) easy to mass produce, and d) in several respects more durable than metal;
3.) the container has non-removable information for easy reference;
4.) existing information and optional sprinkler head allows for broader application of this can;
5.) the thumb-tabbed pointer 15 avoids confusion with easy visual denotation of mixture ratio;
6.) ounces, milliliters and ratio graduation 10B on measuring cup 10A simplify figuring correct amounts to be added to mixture;
7.) the self containment allows for portability and minimizes a) contamination, b) breakage, or c) misplacment of separate articles;
8.) the latch bolt 18 and saddles 19A & 19B require little motion to access can hole 27A and said measuring cup 10A; and
9.) the can gasket 13A, cap groove 13B relating to can lip 27B offer a convenient seal eliminating twisting caps that may rupture gasket or strip threads.

OPERATION FIG. 1A-6A

The manner of using the 2 cycle gas can as appears in FIGS. 4A & 3A., Open hinged cap 30 by sliding the latch bolt 18 towards the thumb tabbed pointer 15 said latch bolt 18 clears the can latch saddle 19B and communicates with plastic cap nut 16. Grasping the circular edges of said cap 30 shown in FIG. 3A traverse 180° towards can's side 28 pivoting cap hinge 21A at cap hinge pin 21B cradeled in can hinge saddle 21C, FIG. 4A & 3A. With measuring cup exposed 10A and in receiving position as seen in FIG. 2A. Refer to gas and oil reference chart 25 FIG. 6A,1A & 2A, or use ounce, milliliter, and ratio graduations 10B on said measuring cup 10A as viewed in FIG. 4A & 5A for proportioning gas and oil. Dispense of gas or other liquid through can hole 27A in FIG. 1A & 2A. Deposit 2 cycle oil or other material in measuring cup 10A FIG. 1A. Dump contents into said can 28 by grasping said hinged cap's 30 circular edges and traverse 90° to seal can hole 27A overlapping can lip 27B to seal cap gasket 13A inside cap groove 13B as shown in FIG. 2A and 4A. Secure said hinged cap 30 by sliding latch bolt 18 away from said plastic cap nut 16 until said bolt 18 is completely communicated with can latch saddle 19B, FIG. 3A & 4A. After said hinged cap 30 is secured in the closed position FIG. 1A, with correct proportions of mixture in said can 28, mix contents by agitation of said can 28 or re-open said hinged cap 30 to stir contents through said can hole 27A if required. Purge any air pressure by counter-clockwise rotation of plastic cap 23B and plastic cap strap 23C over air-release port 23A. Twist said plastic cap nut 16 counter-clockwise to loosen said thumb-tabbed pointer 15 in FIG. 3A,& 4A, rotate said thumb-tabbed pointer 15 on said hinged cap surface 30 FIG. 3A to appropiate engraved ratio 17 to denote mixture in said can 28. Dispense gasoline mixtures or water mixtures via nozzle 24A with said plastic cap 23B removed from air-release port 23A FIG. 2A communicated via plastic cap strap 23C. Apply sprinkler head 29 in FIG. 1A counter-clockwise to threaded nozzle tip 24B for dispensing water solutions.

SUMMARY, RAMIFICATIONS AND SCOPE

Accordingly, the reader will see that the 2 cycle gas can of this invention can be used to mix gas and oil conveniently, accurately and quickly. Due to plastic materials used and simplicity of design, said can will have minimal need for repair resulting from abuse, or exposure and making use of known prior art plastic gas cans currently produced, will require minimal modification to manufacture. Furthermore said 2 cycle gas can has additional advantages in that, 1.) it is corrosion proof if subjected to severe climate or water;
2.) it is somewhat shock resistant exposed to jarring or vibration;
3.) it is portable for transporting in small compartments or going into remote areas;
4.) it is self contained reducing contamination, misplacment, or breakage of separate articles;
5. ) it is a simplistic device for the novice or applied as a teaching tool;
6.) it is affordable for the consumer due to few parts with little labor to produce;
7.) it can be used for other fuel mixtures proportioning gasoline additives;
8.) it allows for easy detection of ratio mixture without opening can or looking for mis-placed labeling;
9.) it is applicable to agricultural or horticultural use as a fertilizer or chemical mixing container and applicator; and
10. ) it is applicable to mixing acids or chemicals for treatment of flat masonry or wooden surfaces.

Although the description above contains many specificities, these should not be construed as limiting the scope of the invention but as merely providing illustrations of some of the presently prefered embodiments of this invention. For example said 2 cycle gas can and its components can be enlarged, reduced, or take on a different shape. The gas/oil ratio reference chart or measuring cup graduations may be changed or added to fit said 2 cycle gas cans specified purpose.

Thus the scope of the invention should be determined by the appended claims and their legal equivalents, rather than by the examples given.

I claim:

1. A gas and oil mixing can for mixing gas and oil in measured ratios comprising in combination:
   a plastic gas can having;
      a top surface with a can handle having an air release port and an oppositely located nozzle having a threaded tip for dispensing a gas and oil mixture, a sealable can hole, and a can latch saddle;
      a side surface with molded graduations for measuring desired quantities of gasoline, and a molded gas and oil ratio reference chart; and,
      a bottom surface;
   a non-removable hinged cap attached by a hinge to said plastic gas can covering said sealable can hole, said hinged cap having;
      a top surface with a sliding latch housed in a cap latch saddle adapted to be received within said can latch saddle, said top surface having a thumb tabbed pointer secured thereto and engraved ratio graduations for denoting the gas and oil mixture in said plastic gas can; and,
      a bottom surface with an integral measuring cup for measuring desired quantities of oil;
   said sliding latch integrating said hinged cap with said plastic gas can when said hinged cap is pivoted about the hinge into a sealed position in which said integral measuring cup is within the plastic gas can.

2. A gas and oil mixing can in accord with claim 1 where all components are manufactured out of plastic.

3. A gas and oil mixing can in accord with claim 1 where all information on said plastic gas can and said measuring cup provides information for mixing gas and oil ratios.

4. A gas and oil mixing can in accord with claim 1 where said molded graduations on said can may be viewed from inside or outside of said plastic gas can for accurate measuring of gasoline.

5. A gas and oil mixing can in accord with claim 1 where ounces, milliliters, and ratio graduations on said measuring cup are provided for accurate measuring of oil.

6. A gas and oil mixing can in accord with claim 1 where said hinged cap provide 180° of transversal to seal said plastic gas can by a cap gasket over said can hole or for getting access to said measuring cup.

7. A gas and oil mixing can in accord with claim 1 where said plastic gas can's hole is convenient for depositing gas and for visual inspection of the gas and oil mixture.

8. A gas and oil mixing can in accord with claim 1 where the said threaded tipped nozzle is adapted to receive a sprinkler head.

* * * * *